(12) United States Patent
Gao

(10) Patent No.: US 11,587,307 B2
(45) Date of Patent: Feb. 21, 2023

(54) CONTROL METHOD AND ELECTRONIC APPARATUS

(71) Applicant: Lenovo (Beijing) Limited, Beijing (CN)

(72) Inventor: Ying Gao, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/473,226

(22) Filed: Sep. 13, 2021

(65) Prior Publication Data

US 2022/0092324 A1 Mar. 24, 2022

(30) Foreign Application Priority Data

Sep. 23, 2020 (CN) .......................... 202011010989.6

(51) Int. Cl.
*G06V 40/13* (2022.01)
*G06V 10/98* (2022.01)
*G06V 40/12* (2022.01)
*G06K 9/62* (2022.01)

(52) U.S. Cl.
CPC ......... *G06V 10/993* (2022.01); *G06K 9/6257* (2013.01); *G06V 40/13* (2022.01); *G06V 40/1365* (2022.01)

(58) Field of Classification Search
None
See application file for complete search history.

(56) References Cited

U.S. PATENT DOCUMENTS

| | | | |
|---|---|---|---|
| 10,405,034 B1 * | 9/2019 | Nijim | H04N 21/4415 |
| 2011/0090047 A1 * | 4/2011 | Patel | G07C 9/37 |
| | | | 340/5.82 |
| 2017/0372121 A1 * | 12/2017 | Zhang | G06K 9/00 |

* cited by examiner

*Primary Examiner* — Joseph R Haley
(74) *Attorney, Agent, or Firm* — Anova Law Group, PLLC

(57) ABSTRACT

A control method includes collecting a biometric image through a sensing area of a biometric recognition sensor provided at a control button of an electronic apparatus, in response to a press operation of a user on the control button; determining whether the biometric image meets a condition; in response to determining that the biometric image meets the condition, allowing the control button to be moved from a first position to a second position; and in response to determining that the biometric image does not meet the condition, prohibiting the control button from being moved from the first position to the second position.

14 Claims, 9 Drawing Sheets

CONTROL METHOD AND ELECTRONIC APPARATUS

CROSS-REFERENCE TO RELATED APPLICATION

This application claim priority to Chinese Patent Application No. 202011010989.6, filed Sep. 23, 2020, the entire content of which is incorporated herein by reference.

TECHNICAL FIELD

The present disclosure relates to the technical field of electronic technology and, more particularly, to a control method and an electronic apparatus.

BACKGROUND

With continuous development of electronic technology, application of a fingerprint sensor is also developing rapidly. Most existing electronic apparatuses tend to have a narrow bezel design, and the fingerprint sensor is added to the bezel. Because the fingerprint sensor arranged at a side of the bezel has a small sensing area, it is difficult for a user to locate during fingerprint recognition, which results in a low fingerprint recognition rate and poor user experience.

Therefore, how to effectively increase the recognition rate of the electronic apparatus to improve user's control experience of the electronic apparatus is an urgent problem to be solved.

SUMMARY

In accordance with the disclosure, there is provided a control method. The control method includes collecting a biometric image through a sensing area of a biometric recognition sensor provided at a control button of an electronic apparatus, in response to a press operation of a user on the control button; determining whether the biometric image meets a condition; in response to determining that the biometric image meets the condition, allowing the control button to be moved from a first position to a second position; and in response to determining that the biometric image does not meet the condition, prohibiting the control button from being moved from the first position to the second position.

Also in accordance with the disclosure, there is provided an electronic apparatus including a control button, a memory, and a processor. The control button includes a sensing area of a biometric recognition sensor. The memory stores program instructions. The processor is configured to execute the program instructions to collect a biometric image through the sensing area, in response to a press operation of a user on the control button; determine whether the biometric image meets a condition; in response to determining that the biometric image meets the condition, allow the control button to be moved from a first position to a second position; and in response to determining that the biometric image does not meet the condition, prohibit the control button from being moved from the first position to the second position.

BRIEF DESCRIPTION OF THE DRAWINGS

In order to explain the embodiments of the present disclosure more clearly, reference is made to the accompanying drawings, which are used in the description of the embodiments. Obviously, the drawings in the following description are some embodiments of the present disclosure, and other drawings can be obtained from these drawings without any inventive effort for those of ordinary skill in the art.

DETAILED DESCRIPTION OF THE EMBODIMENTS

The technical solutions in the embodiments of the present disclosure will be described in detail with reference to the accompanying drawings. Obviously, the described embodiments are only some of rather than all the embodiments of the present disclosure. Based on the described embodiments, all other embodiments obtained by those of ordinary skill in the art without inventive effort shall fall within the scope of the present disclosure.

Figure 1:
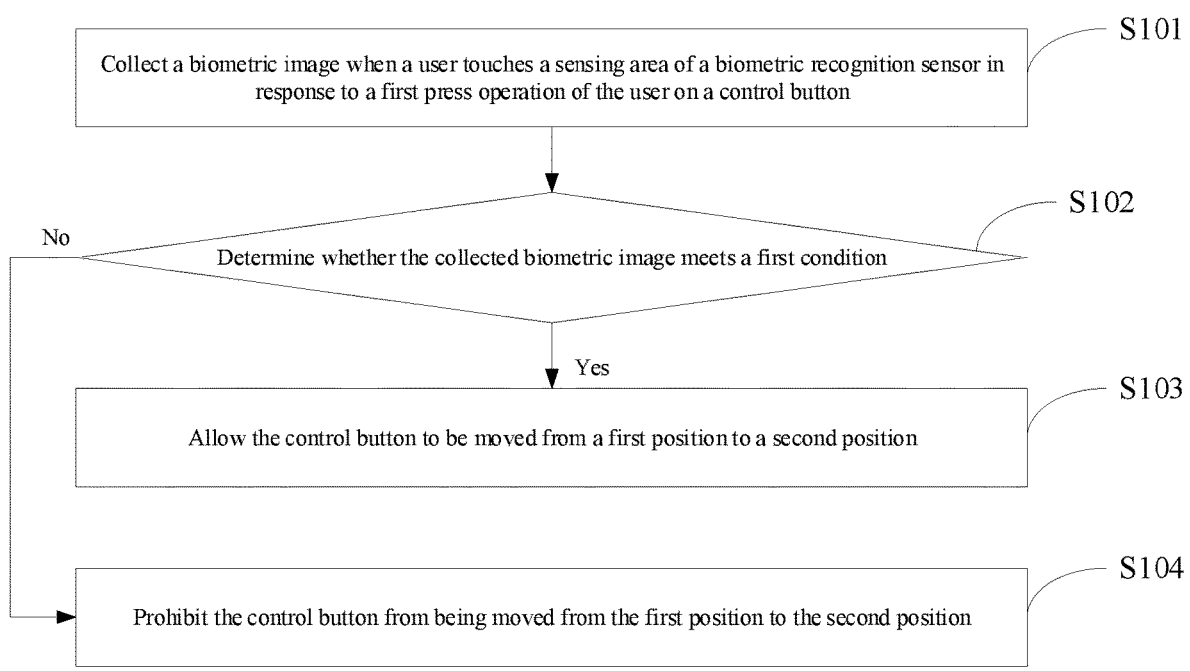
FIG. 1 is a flow chart of an example control method consistent with the present disclosure.

FIG. 1 is a flow chart of an example control method consistent with the present disclosure. The method is applied to an electronic apparatus which may be a smart device such as a smart phone, a tablet computer, or a notebook computer. The electronic apparatus includes a control button, and the control button is provided with a sensing area of a biometric recognition sensor. For example, the set sensing area of the biometric recognition sensor can sense biometric characteristics such as a fingerprint or a vein. The method includes the following processes.

S101, collecting a biometric image when a user touches the sensing area of the biometric recognition sensor in response to a first press operation of the user on the control button.

When the user presses the control button of the electronic apparatus, in response to the pressing on the control button of the user, the biometric recognition sensor collects the biometric image when the user touches the sensing area of the biometric recognition sensor during pressing on the control button.

For example, the biometric recognition sensor may be a fingerprint sensor. When the user presses the control button with a finger, the fingerprint sensor collects a fingerprint image when the finger of the user touches a sensing area of the fingerprint sensor.

S102, determining whether the collected biometric image meets a first condition. If yes, S103 is executed; if not, S104 is executed.

After the biometric image when the user touches the sensing area of the biometric recognition sensor is collected, it is further determined whether the collected biometric image meets the set first condition, where the first condition can be flexibly set according to actual application requirements.

S103, allowing the control button to be moved from a first position to a second position.

When the collected biometric image meets the set first condition, the control button can be moved from the first position to the second position when the user presses the control button. For example, the control button can be designed with structure position. When the collected biometric image meets the set first condition, structure of the control button is switched to a pressable mode, and the control button can be moved from the first position to the second position when the user presses the control button.

S104, prohibiting the control button from being moved from the first position to the second position.

When the collected biometric image does not meet the set first condition, the control button cannot be moved from the first position to the second position when the user presses the control button, that is, the control button cannot be pressed. For example, when the collected biometric image does not meet the set first condition, the structure of the control button is switched to a non-pressable mode through an electromagnet, and the control button cannot be moved from the first position to the second position when the user presses the control button.

In summary, in the above embodiments, when it is needed to control the electronic apparatus, firstly, the biometric image is collected when the user touches the sensing area of the biometric recognition sensor in response to the first press operation of the user on the control button; and then it is determined whether the collected biometric image meets the first condition; if yes, the control button is allowed to be moved from the first position to the second position; if not, the control button is prohibited from being moved from the first position to the second position. As can be seen, the user can press the control button to move it from the first position to the second position only when the collected biometric image meets the first condition, which effectively avoids that the user frequently presses the control button of the electronic apparatus when the collected biometric image does not meet the first condition, so that a recognition rate of the electronic apparatus is effectively increased, and user's control experience of the electronic apparatus is improved.

Figure 2:
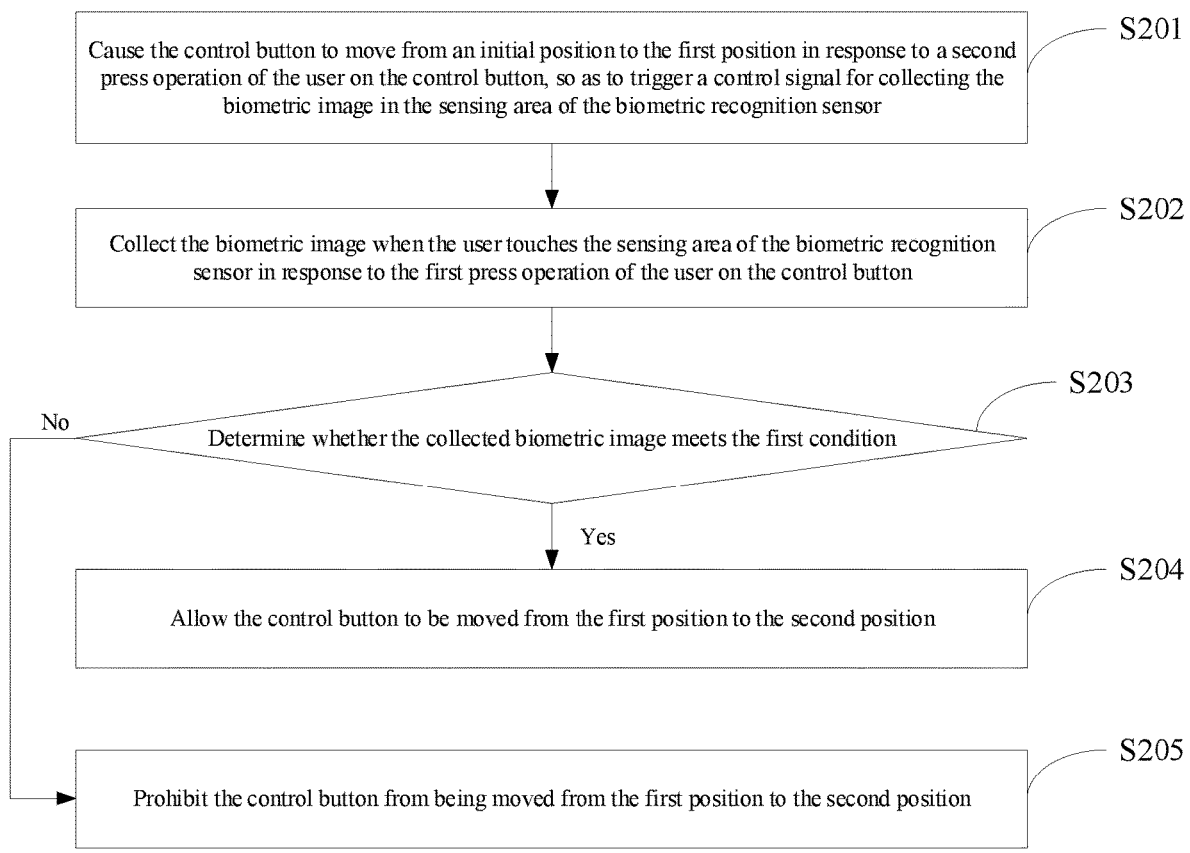
FIG. 2 is a flow chart of another example control method consistent with the present disclosure.

FIG. 2 is a flow chart of another example control method consistent with the present disclosure. The method is applied to the electronic apparatus which may be a smart device such as a smart phone, a tablet computer, or a notebook computer. The electronic apparatus includes the control button, and the control button is provided with the sensing area of the biometric recognition sensor. For example, the set sensing area of the biometric recognition sensor can sense the biometric characteristics such as a fingerprint or a vein. The method includes the following processes.

S201, causing the control button to move from an initial position to the first position in response to a second press operation of the user on the control button, so as to trigger a control signal for collecting the biometric image in the sensing area of the biometric recognition sensor.

When the user needs to control the electronic apparatus, the control button can be moved from the initial position to the first position when the user presses the control button of the electronic apparatus for a first time. When the control button is moved from the initial position to the first position, the control signal can be triggered, and the triggered control signal can cause the biometric recognition sensor to be powered on to collect the biometric image in the sensing area of the biometric recognition sensor. Correspondingly, when the control button is not moved from the initial position to the first position, the biometric recognition sensor is not powered on.

It should be noted that a pressure sensor or a passive pressure sensor can be used to detect whether the control button is moved from the initial position to the first position. When the control button is moved from the initial position to the first position, the control signal is triggered by the pressure sensor or the passive pressure sensor.

S202, collecting the biometric image when the user touches the sensing area of the biometric recognition sensor in response to the first press operation of the user on the control button.

After the control button is moved from the initial position to the first position, the biometric recognition sensor is powered on at this time, so when the user presses the control button of the electronic apparatus again, in response to the pressing on the control button of the user, the biometric recognition sensor collects the biometric image when the user touches the sensing area of the biometric recognition sensor during pressing on the control button.

For example, the biometric recognition sensor may be the fingerprint sensor. When the user presses the control button with the finger, the fingerprint sensor collects the fingerprint image when the finger of the user touches the sensing area of the fingerprint sensor.

S203, determining whether the collected biometric image meets the first condition. If yes, S204 is executed; if not, S205 is executed.

After the biometric image when the user touches the sensing area of the biometric recognition sensor is collected, it is further determined whether the collected biometric image meets the set first condition, where the first condition can be flexibly set according to actual application requirements.

S204, allowing the control button to be moved from the first position to the second position. A distance between the initial position and the first position is smaller than a distance between the first position and the second position.

When the collected biometric image meets the set first condition, the control button can be moved from the first position to the second position when the user presses the control button. For example, the control button can be designed with structure position. When the collected biometric image meets the set first condition, the structure of the control button is switched to the pressable mode, and the control button can be moved from the first position to the second position when the user presses the control button.

It should be noted that the distance between the initial position and the first position may be smaller than the distance between the first position and the second position. A smaller distance between the initial position and the first position is set, so that the user can trigger the control signal for powering on the biometric recognition sensor when the user presses the control button of the electronic apparatus lightly for the first time, which can further improve user experience.

S205, prohibiting the control button from being moved from the first position to the second position.

When the collected biometric image does not meet the set first condition, the control button cannot be moved from the first position to the second position when the user presses the control button, that is, the control button cannot be pressed.

For example, when the collected biometric image does not meet the set first condition, the structure of the control button is switched to the non-pressable mode through the electromagnet, and the control button cannot be moved from the first position to the second position when the user presses the control button.

In summary, in the above embodiments, when it is needed to control the electronic apparatus, the control button can be moved from the initial position to the first position when the user presses the control button for the first time, which further triggers the control signal for powering on the biometric recognition sensor. As can be seen, the biometric recognition sensor in the electronic apparatus does not need to be in a powered state all the time, and can be powered on only when the control button is moved from the initial position to the first position, which effectively improves the recognition rate of the electronic apparatus, reduces power consumption of the electronic apparatus, and further improves the user experience.

Figure 3:
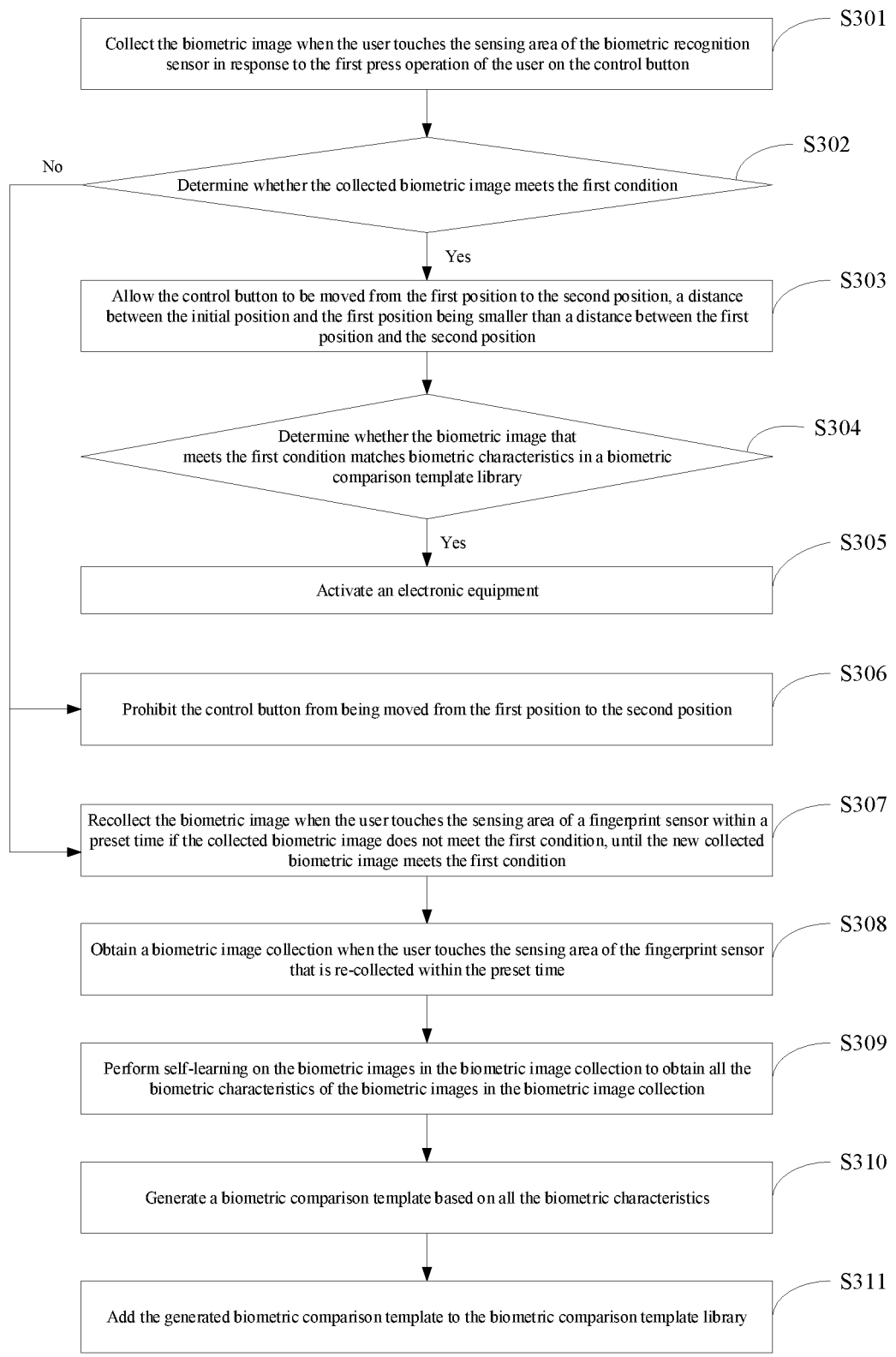
FIG. 3 is a flow chart of another example control method consistent with the present disclosure.

FIG. 3 is a flow chart of another example control method consistent with the present disclosure on the basis of the foregoing embodiments. The method is applied to the electronic apparatus which may be a smart device such as a smart phone, a tablet computer, or a notebook computer. The electronic apparatus includes the control button, and the control button is provided with the sensing area of the biometric recognition sensor. For example, the set sensing area of the biometric recognition sensor can sense the biometric characteristics such as a fingerprint or a vein. The method includes the following processes.

S301, collecting the biometric image when the user touches the sensing area of the biometric recognition sensor in response to the first press operation of the user on the control button.

S302, determining whether the collected biometric image meets the first condition. If yes, S303 is executed; if not, S306 is executed.

S303, allowing the control button to be moved from the first position to the second position.

S304, determining whether the biometric image that meets the first condition matches the biometric characteristics in a biometric comparison template library. If yes, S305 is executed.

After the control button is moved from the first position to the second position, it is further determined whether the collected biometric image that meets the first condition matches the biometric characteristics in the pre-built biometric comparison template library. The biometric comparison template library may include multiple biometric characteristics.

For example, it is determined whether the collected fingerprint image that meets the first condition matches one of the fingerprint images in the biometric comparison template library.

S305, activating the electronic apparatus.

When the biometric image that meets the first condition matches the biometric characteristics in the biometric comparison template library, the electronic apparatus can be activated, for example, the electronic apparatus can enter a working state from a dormant state.

S306, prohibiting the control button from being moved from the first position to the second position.

When the collected biometric image does not meet the set first condition, the control button cannot be moved from the first position to the second position when the user presses the control button, that is, the control button cannot be pressed. For example, when the collected biometric image does not meet the set first condition, the structure of the control button is switched to the non-pressable mode through the electromagnet, and the control button cannot be moved from the first position to the second position when the user presses the control button.

S307, recollecting the biometric image when the user touches the sensing area of the fingerprint sensor within a preset time if the collected biometric image does not meet the first condition, until the new collected biometric image meets the first condition.

If the collected biometric image does not meet the set first condition, the user can press the control button multiple times within the preset time, and during that the biometric image when the user touches the sensing area of the fingerprint sensor is collected again. Within the preset time, collection of the biometric image when the user touches the sensing area of the fingerprint sensor does not stop until the new collected biometric image meets the first condition.

It should be noted that the preset time can be flexibly set according to actual needs. For example, the preset time can be set to 300 ms.

S308, obtaining a biometric image collection when the user touches the sensing area of the fingerprint sensor that is re-collected within the preset time.

In some embodiments, all the biometric images when the user touches the sensing area of the fingerprint sensor that are re-collected within the preset time are obtained to form the biometric image collection. For example, biometric image A1, biometric image A2, and biometric image A3 when the user touches the sensing area of the fingerprint sensor that are re-collected within the preset time are obtained to form the biometric image collection consisting of the biometric image A1, the biometric image A2, and the biometric image A3.

S309, performing self-learning on the biometric images in the biometric image collection to obtain all the biometric characteristics of the biometric images in the biometric image collection.

In some embodiments, self-learning is performed on all the biometric images in the obtained biometric image collection to obtain all the biometric characteristics of the biometric images in the biometric image collection.

S310, generating a biometric comparison template based on all the biometric characteristics.

In some embodiments, the biometric comparison template is generated based on all the obtained biometric characteristics.

S311, adding the generated biometric comparison template to the biometric comparison template library.

In some embodiments, the generated biometric comparison template is added to the biometric comparison template library, which can further enrich the biometric characteristics in the biometric comparison template library, so that the biometric image that meets the first condition can be more easily matched with the biometric characteristics in the biometric comparison template library, which makes it easier to activate the electronic apparatus, and further improves the user experience.

In summary, in the above embodiments, after the control button is allowed to be moved from the first position to the second position, the electronic apparatus can be activated if the biometric image that meets the first condition matches the biometric characteristics in the biometric comparison template library, which further realizes control of the electronic apparatus. In addition, the biometric image when the user touches the sensing area of the fingerprint sensor within the preset time can be further re-collected if the collected biometric image does not meet the first condition, until the new collected biometric image meets the first condition; and the biometric image collection when the user touches the sensing area of the fingerprint sensor that is re-collected within the preset time is obtained; self-learning is performed on the biometric images in the biometric image collection to obtain all the biometric characteristics of the biometric images in the biometric image collection; the biometric comparison template is generated based on all the biometric characteristics; the generated biometric comparison template is added to the biometric comparison template library, which can further enrich the biometric characteristics in the biometric comparison template library, so that the biometric image that meets the first condition can be more easily matched with the biometric characteristics in the biometric comparison template library, which makes it easier to activate the electronic apparatus, and further improves the user experience.

Figure 4:
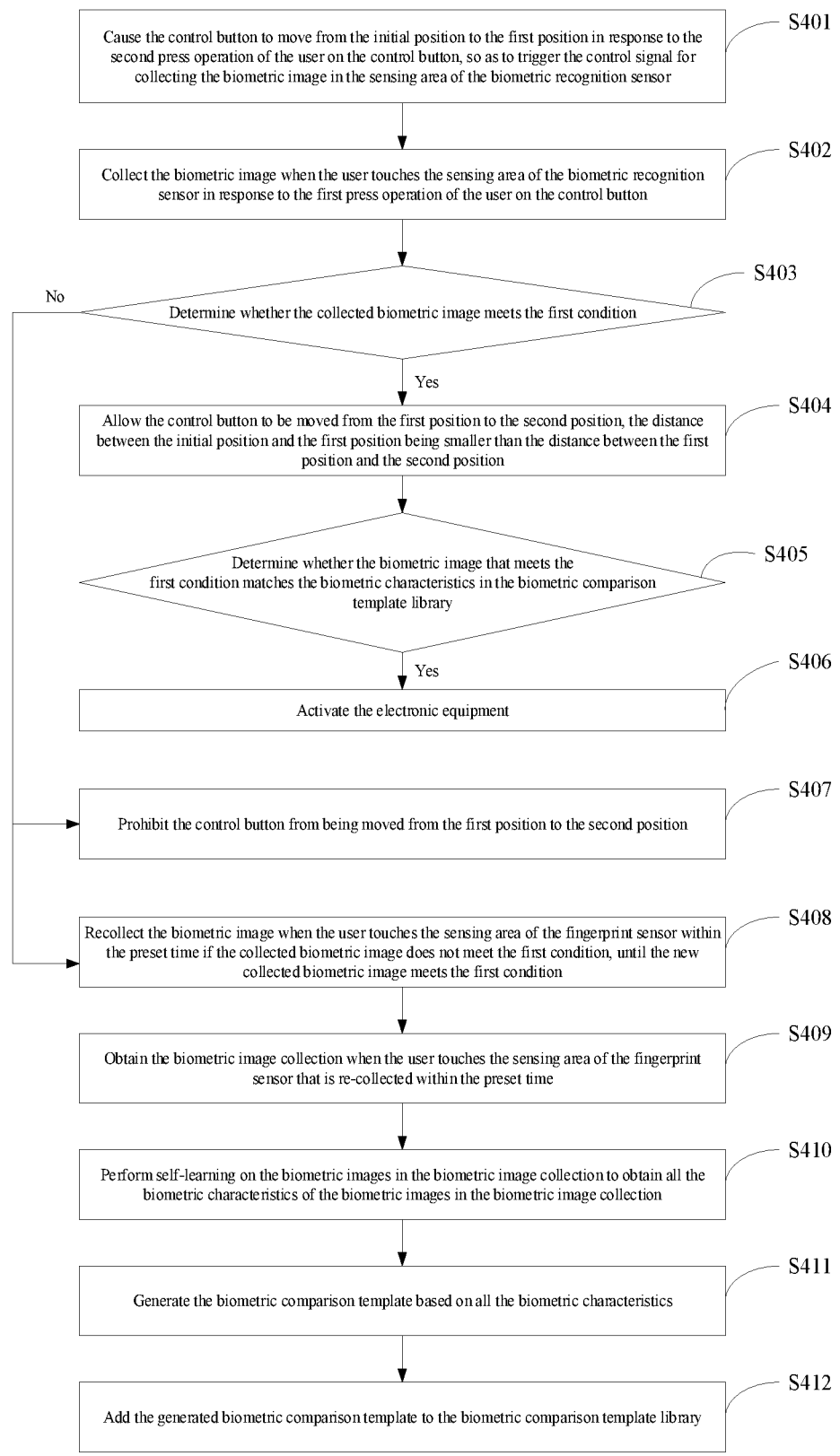
FIG. 4 is a flow chart of another example control method consistent with the present disclosure.

FIG. 4 is a flow chart of another example control method consistent with the present disclosure on the basis of the foregoing embodiments. The method is applied to the electronic apparatus which may be a smart device such as a smart phone, a tablet computer, or a notebook computer. The electronic apparatus includes the control button, and the control button is provided with the sensing area of the biometric recognition sensor. For example, the set sensing area of the biometric recognition sensor can sense the biometric characteristics such as a fingerprint or a vein. The method includes the following processes.

S401, causing the control button to move from the initial position to the first position in response to the second press operation of the user on the control button, so as to trigger the control signal for collecting the biometric image in the sensing area of the biometric recognition sensor.

S402, collecting the biometric image when the user touches the sensing area of the biometric recognition sensor in response to the first press operation of the user on the control button.

S403, determining whether the collected biometric image meets the first condition. If yes, S404 is executed; if not, S407 is executed.

S404, allowing the control button to be moved from the first position to the second position. The distance between the initial position and the first position is smaller than the distance between the first position and the second position.

S405, determining whether the biometric image that meets the first condition matches the biometric characteristics in the biometric comparison template library. If yes, S406 is executed.

After the control button is moved from the first position to the second position, it is further determined whether the collected biometric image that meets the first condition matches the biometric characteristics in the pre-built biometric comparison template library. The biometric comparison template library may include multiple biometric characteristics.

For example, it is determined whether the collected fingerprint image that meets the first condition matches one of the fingerprint images in the biometric comparison template library.

S406, activating the electronic apparatus.

When the biometric image that meets the first condition matches the biometric characteristics in the biometric comparison template library, the electronic apparatus can be activated, for example, the electronic apparatus can enter the working state from the dormant state.

S407, prohibiting the control button from being moved from the first position to the second position.

When the collected biometric image does not meet the set first condition, the control button cannot be moved from the first position to the second position when the user presses the control button, that is, the control button cannot be pressed. For example, when the collected biometric image does not meet the set first condition, the structure of the control button is switched to the non-pressable mode through the electromagnet, and the control button cannot be moved from the first position to the second position when the user presses the control button.

S408, recollecting the biometric image when the user touches the sensing area of the fingerprint sensor within the preset time if the collected biometric image does not meet the first condition, until the new collected biometric image meets the first condition.

If the collected biometric image does not meet the set first condition, the user can press the control button multiple times within the preset time, and during that the biometric image when the user touches the sensing area of the fingerprint sensor is collected again. Within the preset time, collection of the biometric image when the user touches the sensing area of the fingerprint sensor does not stop until the new collected biometric image meets the first condition.

It should be noted that the preset time can be flexibly set according to actual needs. For example, the preset time can be set to 300 ms.

S409, obtaining the biometric image collection when the user touches the sensing area of the fingerprint sensor that is re-collected within the preset time.

In some embodiments, all the biometric images when the user touches the sensing area of the fingerprint sensor that are re-collected within the preset time are obtained to form the biometric image collection. For example, biometric image A1, biometric image A2, and biometric image A3 when the user touches the sensing area of the fingerprint sensor that are re-collected within the preset time are obtained to form the biometric image collection consisting of the biometric image A1, the biometric image A2, and the biometric image A3.

S410, performing self-learning on the biometric images in the biometric image collection to obtain all the biometric characteristics of the biometric images in the biometric image collection.

In some embodiments, self-learning is performed on all the biometric images in the obtained biometric image collection to obtain all the biometric characteristics of the biometric images in the biometric image collection.

S411, generating the biometric comparison template based on all the biometric characteristics.

In some embodiments, the biometric comparison template is generated based on all the obtained biometric characteristics.

S412, adding the generated biometric comparison template to the biometric comparison template library.

In some embodiments, the generated biometric comparison template is added to the biometric comparison template library, which can further enrich the biometric characteristics in the biometric comparison template library, so that the biometric image that meets the first condition can be more easily matched with the biometric characteristics in the biometric comparison template library, which makes it easier to activate the electronic apparatus, and further improves the user experience.

In summary, in the above embodiments, after the control button is allowed to be moved from the first position to the second position, the electronic apparatus can be activated if the biometric image that meets the first condition matches the biometric characteristics in the biometric comparison template library, which further realizes control of the electronic apparatus. In addition, the biometric image when the user touches the sensing area of the fingerprint sensor within the preset time can be further re-collected if the collected biometric image does not meet the first condition, until the new collected biometric image meets the first condition; and the biometric image collection when the user touches the sensing area of the fingerprint sensor that is re-collected within the preset time is obtained; self-learning is performed on the biometric images in the biometric image collection to obtain all the biometric characteristics of the biometric images in the biometric image collection; the biometric comparison template is generated based on all the biometric characteristics; the generated biometric comparison template is added to the biometric comparison template library, which can further enrich the biometric characteristics in the biometric comparison template library, so that the biometric image that meets the first condition can be more easily matched with the biometric characteristics in the biometric comparison template library, which makes it easier to activate the electronic apparatus, and further improves the user experience.

Specifically, in the foregoing embodiments, one of the implementation manners for determining whether the collected biometric image meets the first condition may be to determine whether the collected biometric image meets preset image quality. When it is determined whether the collected biometric image meets the preset image quality, it can be specifically determined whether a signal-to-noise ratio of the collected biometric image reaches a preset threshold, and when the signal-to-noise ratio of the collected biometric image reaches the preset threshold, it is further determined whether an area of the collected biometric image is greater than a preset value. That is, when the signal-to-noise ratio of the collected biometric image reaches the preset threshold, and the area of the collected biometric image is greater than the preset value, it indicates that the collected biometric image meets the first condition. The preset image quality, the preset threshold, and the preset value can be flexibly set according to actual needs.

Specifically, in the foregoing embodiments, another implementation manner for determining whether the collected biometric image meets the first condition may be to determine whether the collected biometric image matches a preset target image. When the collected biometric image matches the preset target image, it indicates that the collected biometric image meets the first condition. For example, when the collected fingerprint image of the user matches a preset target fingerprint image, the collected fingerprint image of the user meets the first condition.

Figure 5:
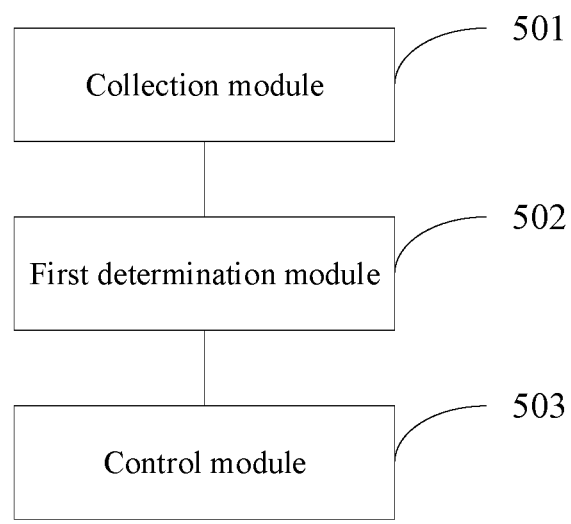
FIG. 5 is a schematic structural diagram of an example electronic apparatus consistent with the present disclosure.

FIG. 5 is a schematic structural diagram of the electronic apparatus according to an embodiment of the present disclosure. The electronic apparatus may be a smart device such as a smart phone, a tablet computer, or a notebook computer. The electronic apparatus includes the control button, and the control button is provided with the sensing area of the biometric recognition sensor. For example, the set sensing area of the biometric recognition sensor can sense the biometric characteristics such as a fingerprint or a vein. The electronic apparatus also includes a collection module 501, a first determination module 502, and a control module 503. The collection module 501 is configured to collect the biometric image when the user touches the sensing area of the biometric recognition sensor in response to the first press operation of the user on the control button. The first determination module 502 is configured to determine whether the collected biometric image meets the first condition. The control module 503 is configured to allow the control button to be moved from the first position to the second position if the collected biometric image meets the first condition. The control module 503 is also configured to prohibit the control button from being moved from the first position to the second position if the collected biometric image does not meet the first condition.

In summary, the working principle of the electronic apparatus disclosed in the present disclosure is the same as the working principle of the above-mentioned control method consistent with the present disclosure, and will not be repeated herein.

Figure 6:
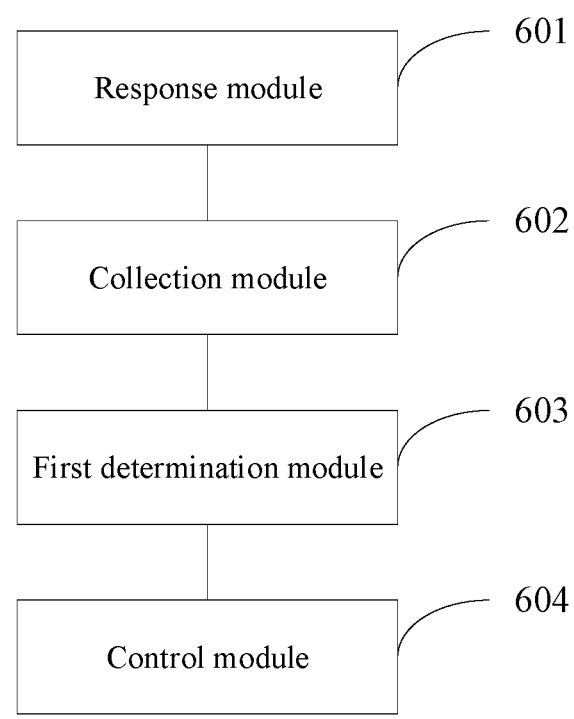
FIG. 6 is a schematic structural diagram of another example electronic apparatus consistent with the present disclosure.

FIG. 6 is a schematic structural diagram of the electronic apparatus according to another embodiment of the present disclosure. The electronic apparatus may be a smart device such as a smart phone, a tablet computer, or a notebook computer. The electronic apparatus includes the control button, and the control button is provided with the sensing area of the biometric recognition sensor. For example, the set sensing area of the biometric recognition sensor can sense the biometric characteristics such as a fingerprint or a vein. The electronic apparatus also includes a response module 601, a collection module 602, a first determination module 603, and a control module 604. The response module 601 is configured to cause the control button to move from the initial position to the first position in response to the second press operation of the user on the control button, so as to trigger the control signal for collecting the biometric image in the sensing area of the biometric recognition sensor. The collection module 602 is configured to collect the biometric image when the user touches the sensing area of the biometric recognition sensor in response to the first press operation of the user on the control button. The first determination module 603 is configured to determine whether the collected biometric image meets the first condition. The control module 604 is configured to allow the control button to be moved from the first position to the second position if the collected biometric image meets the first condition. The distance between the initial position and the first position is smaller than the distance between the first position and the second position. The control module 604 is also configured to prohibit the control button from being moved from the first position to the second position if the collected biometric image does not meet the first condition.

In summary, the working principle of the electronic apparatus disclosed in the present disclosure is the same as the working principle of the above-mentioned control method consistent with the present disclosure, and will not be repeated herein.

Figure 7:
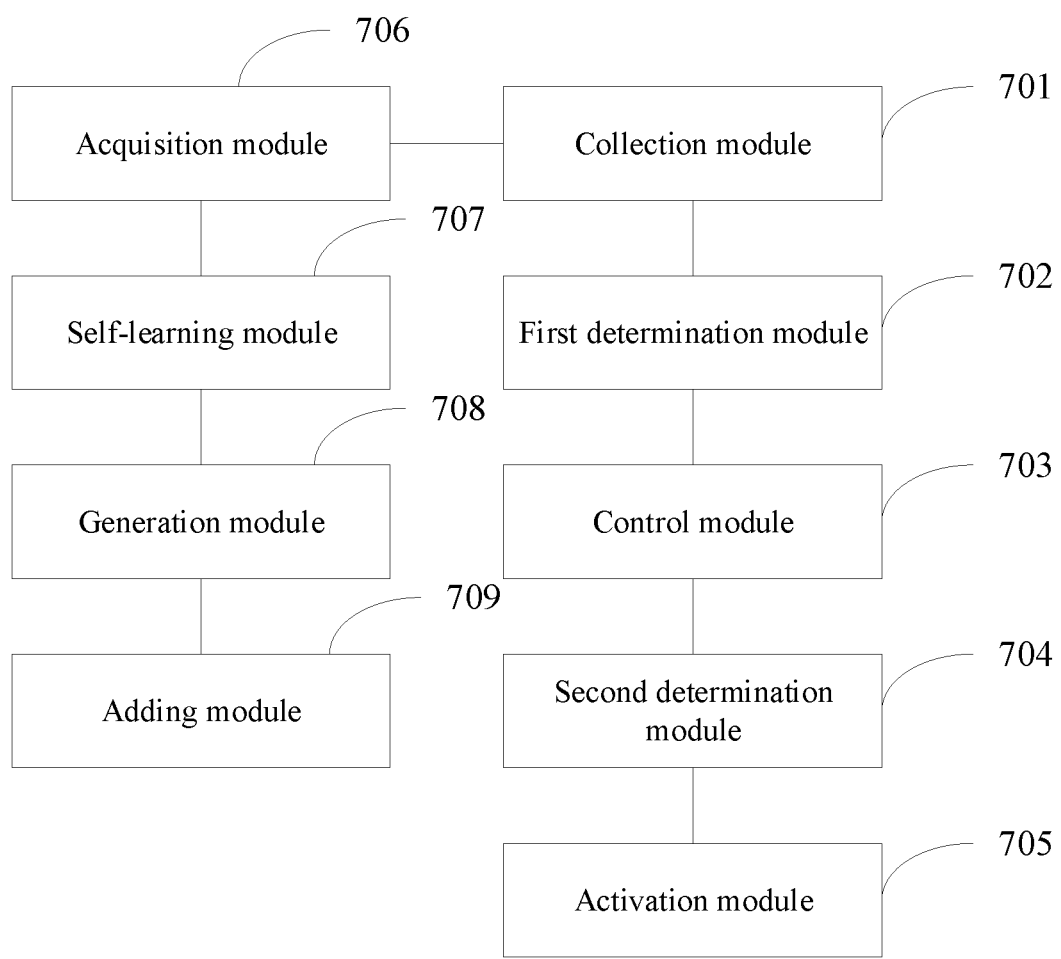
FIG. 7 is a schematic structural diagram of another example electronic apparatus consistent with the present disclosure.

FIG. 7 is a schematic structural diagram of the electronic apparatus according to another embodiment of the present disclosure. The electronic apparatus may be a smart device such as a smart phone, a tablet computer, or a notebook computer. The electronic apparatus includes the control button, and the control button is provided with the sensing area of the biometric recognition sensor. For example, the set sensing area of the biometric recognition sensor can sense the biometric characteristics such as a fingerprint or a vein. The electronic apparatus also includes a collection module 701, a first determination module 702, a control module 703, a second determination module 704, an activation module 705, an acquisition module 706, a self-learning module 707, a generation module 708, and an adding module 709. The collection module 701 is configured to collect the biometric image when the user touches the sensing area of the biometric recognition sensor in response to the first press operation of the user on the control button. The first determination module 702 is configured to determine whether the collected biometric image meets the first condition. The control module 703 is configured to allow the control button to be moved from the first position to the second position if the collected biometric image meets the first condition. The second determination module 704 is configured to determine whether the biometric image that meets the first condition matches the biometric characteristics in the biometric comparison template library. The activation module 705 is configured to activate the electronic apparatus if the biometric image that meets the first condition matches the biometric characteristics in the biometric comparison template library. The control module 703 is also configured to prohibit the control button from being moved from the first position to the second position. The collection module 701 is also configured to recollect the biometric image when the user touches the sensing area of the fingerprint sensor within the preset time if the collected biometric image does not meet the first condition, until the new collected biometric image meets the first condition. The acquisition module 706 is configured to obtain the biometric image collection when the user touches the sensing area of the fingerprint sensor that is re-collected within the preset time. The self-learning module 707 is configured to perform self-learning on the biometric images in the biometric image collection to obtain all the biometric characteristics of the biometric images in the biometric image collection. The generation module 708 is configured to generate the biometric comparison template based on all the biometric characteristics. The adding module 709 is configured to add the generated biometric comparison template to the biometric comparison template library.

In summary, the working principle of the electronic apparatus disclosed in the present disclosure is the same as the working principle of the above-mentioned control method consistent with the present disclosure, and will not be repeated herein.

Figure 8:
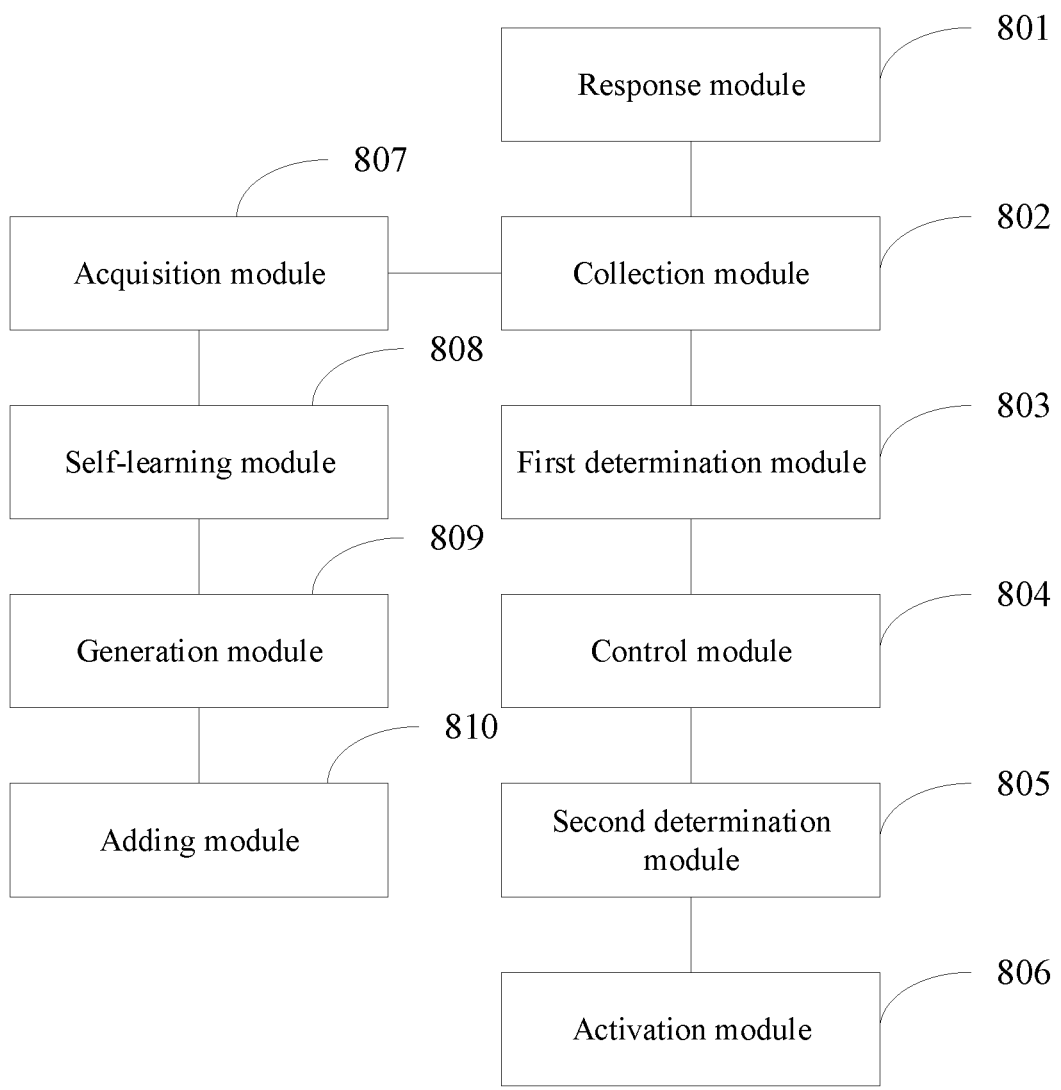
FIG. 8 is a schematic structural diagram of another example electronic apparatus consistent with the present disclosure.

FIG. 8 is a schematic structural diagram of the electronic apparatus according to another embodiment of the present disclosure. The electronic apparatus may be a smart device such as a smart phone, a tablet computer, or a notebook computer. The electronic apparatus includes the control button, and the control button is provided with the sensing area of the biometric recognition sensor. For example, the set sensing area of the biometric recognition sensor can sense the biometric characteristics such as a fingerprint or a vein. The electronic apparatus also includes a response module 801, a collection module 802, a first determination module 803, a control module 804, a second determination module 805, an activation module 806, an acquisition module 807, a self-learning module 808, a generation module 809, and an adding module 810. The response module 801 is configured to cause the control button to move from the initial position to the first position in response to the second press operation of the user on the control button, so as to trigger the control signal for collecting the biometric image in the sensing area of the biometric recognition sensor. The collection module 802 is configured to collect the biometric image when the user touches the sensing area of the biometric recognition sensor in response to the first press operation of the user on the control button. The first determination module 803 is configured to determine whether the collected biometric image meets the first condition. The control module 804 is configured to allow the control button to be moved from the first position to the second position if the collected biometric image meets the first condition. The distance between the initial position and the first position is smaller than the distance between the first position and the second position. The second determination module 805 is configured to determine whether the biometric image that meets the first condition matches the biometric characteristics in the biometric comparison template library. The activation module 806 is configured to activate the electronic apparatus if the biometric image that meets the first condition matches the biometric characteristics in the biometric comparison template library. The control module 804 is also configured to prohibit the control button from being moved from the first position to the second position if the collected biometric image does not meet the first condition. The collection module 802 is also configured to recollect the biometric image when the user touches the sensing area of the fingerprint sensor within the preset time if the collected biometric image does not meet the first condition, until the new collected biometric image meets the first condition. The acquisition module 807 is configured to obtain the biometric image collection when the user touches the sensing area of the fingerprint sensor that is re-collected within the preset time. The self-learning module 808 is configured to perform self-learning on the biometric images in the biometric image collection to obtain all the biometric characteristics of the biometric images in the biometric image collection. The generation module 809 is configured to generate the biometric comparison template based on all the biometric characteristics. The adding module 810 is configured to add the generated biometric comparison template to the biometric comparison template library.

Specifically, in the foregoing embodiments, one of the implementation manners of the first determination module when determining whether the collected biometric image meets the first condition may be to determine whether the collected biometric image meets preset image quality. When it is determined whether the collected biometric image meets the preset image quality, it can be specifically determined whether a signal-to-noise ratio of the collected biometric image reaches a preset threshold, and when the signal-to-noise ratio of the collected biometric image reaches the preset threshold, it is further determined whether an area of the collected biometric image is greater than a preset value. That is, when the signal-to-noise ratio of the collected biometric image reaches the preset threshold, and the area of the collected biometric image is greater than the preset value, it indicates that the collected biometric image meets the first condition. The preset image quality, the preset threshold, and the preset value can be flexibly set according to actual needs.

Specifically, in the foregoing embodiments, another implementation manner of the first determination module when determining whether the collected biometric image meets the first condition may be to determine whether the collected biometric image matches a preset target image. When the collected biometric image matches the preset target image, it indicates that the collected biometric image meets the first condition. For example, when the collected fingerprint image of the user matches a preset target fingerprint image, the collected fingerprint image of the user meets the first condition.

Figure 9:
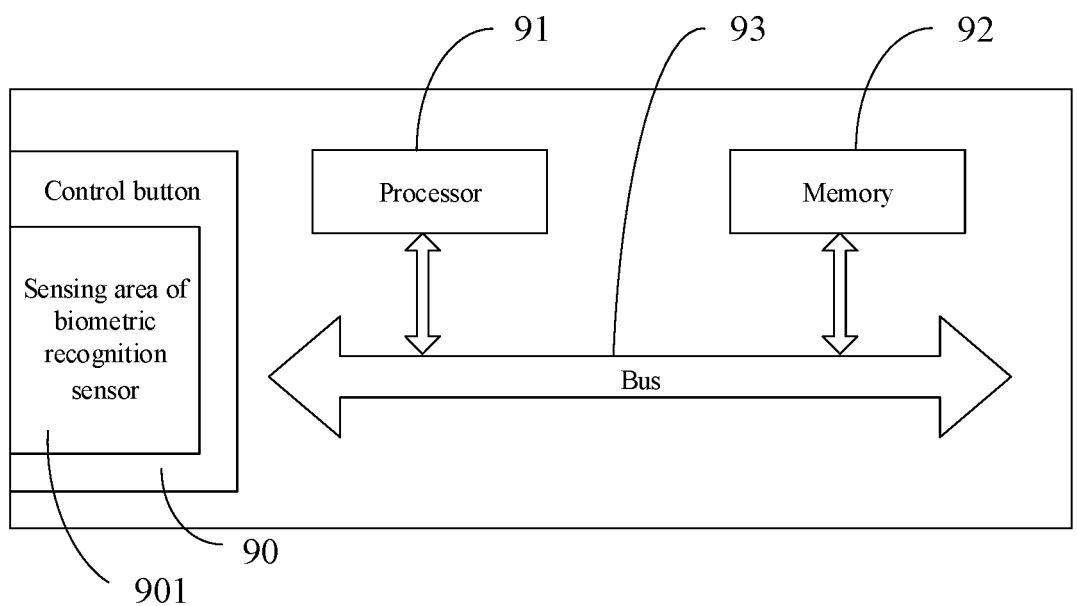
FIG. 9 is a schematic structural diagram of another example electronic apparatus consistent with the present disclosure.

FIG. 9 is a schematic structural diagram of the electronic apparatus according to another embodiment of the present disclosure. The electronic apparatus may be a smart device such as a smart phone, a tablet computer, or a notebook computer. The electronic apparatus includes a control button 90, and the control button 90 is provided with a sensing area of a biometric recognition sensor 901. For example, the set sensing area of the biometric recognition sensor can sense the biometric characteristics such as a fingerprint or a vein. The electronic apparatus also includes at least one processor 91, at least one memory 92 connected to the processor 91, and a bus 93. The processor 91 and the memory 92 communicate with each other through the bus 93. The processor 91 is configured to call program instructions in the memory 92 to execute the control method described above.

It should be noted that the various embodiments in this specification are described in a progressive manner. Each embodiment focuses on the differences from other embodiments, and for the same or similar parts between the various embodiments, reference can be made to each other. For the device or system embodiments, since it is basically similar to the method embodiments, the description is relatively simple, and for relevant parts, reference can be made to the description of the method embodiments.

It should also be noted that relational terms such as first and second are only used herein to distinguish one entity or operation from another entity or operation, and do not necessarily require or imply any such actual relationship or order between these entities or operations. The terms "include," "involve" or any other variations thereof are intended to cover non-exclusive inclusion, so that a process, method, object, or device including a series of elements not only includes those elements, but also includes other elements that are not explicitly listed, or also includes elements inherent to such processes, method, object, or device. Without further restrictions, the element associated with phrase "including a . . . " does not exclude the existence of other identical elements in the process, method, object, or device that includes the element.

Processes of the method or algorithm described in the embodiments disclosed herein can be directly implemented by a hardware, a software module executed by a processor, or a combination of the two. The software module can be placed in a random access memory (RAM), an internal memory, a read only memory (ROM), an electrically programmable ROM, an electrically erasable programmable ROM, a register, a hard disk, a removable disk, a CD-ROM, or any other form of storage medium known in the technical field.

The above description of the disclosed embodiments enables those skilled in the art to implement or use the present disclosure. Various modifications to these embodiments will be obvious to those skilled in the art, and the general principles defined herein can be implemented in other embodiments without departing from the spirit or scope of the present disclosure. Therefore, the present disclosure will not be limited to the embodiments shown herein, but should conform to the widest scope consistent with the principles and features provided herein.

What is claimed is:

1. A control method comprising:
    collecting a biometric image through a sensing area of a biometric recognition sensor provided at a control button of an electronic apparatus, in response to a press operation of a user on the control button;
    determining whether the biometric image meets a condition including matching biometric characteristics in a biometric characteristic comparison template library;
    in response to determining that the biometric image meets the condition, allowing the control button to be moved from a first position to a second position and subsequently activating the electronic apparatus; and
    in response to determining that the biometric image does not meet the condition, prohibiting the control button from being moved from the first position to the second position.

2. The method of claim 1,
    wherein the press operation is a first press operation;
    the method further comprising, before collecting the biometric image:
        causing the control button to move from an initial position to the first position in response to a second press operation of the user on the control button, to trigger a control signal for collecting the biometric image in the sensing area of the biometric recognition sensor, a distance between the initial position and the first position being smaller than a distance between the first position and the second position.

3. The method of claim 1, wherein determining whether the biometric image meets the condition includes determining whether the biometric image meets a preset image quality.

4. The method of claim 3, wherein determining whether the biometric image meets the preset image quality includes:
    determining whether a signal-to-noise ratio of the biometric image reaches a preset threshold; and
    in response to determining that the signal-to-noise ratio reaches the preset threshold, determining whether an area of the biometric image is greater than a preset value.

5. The method of claim 1, wherein determining whether the biometric image meets the condition includes determining whether the biometric image matches a preset target image.

6. The method of claim 1, further comprising:
    in response to the biometric image does not meet the condition, recollecting the biometric image within a preset time until the newly collected biometric image meets the condition.

7. The method of claim 6, further comprising:
    obtaining a biometric image collection through the sensing area of the fingerprint sensor that is re-collected within the preset time;
    performing self-learning on biometric images in the biometric image collection to obtain biometric characteristics of the biometric images in the biometric image collection;
    generating a biometric comparison template based on the biometric characteristics; and
    adding the biometric comparison template to a biometric comparison template library.

8. An electronic apparatus comprising:
    a control button including a sensing area of a biometric recognition sensor;
    a memory storing program instructions; and
    a processor configured to execute the program instructions to:
        collect a biometric image through the sensing area, in response to a press operation of a user on the control button;
        determine whether the biometric image meets a condition including matching biometric characteristics in a biometric characteristic comparison template library;
        in response to determining that the biometric image meets the condition, allow the control button to be moved from a first position to a second position and subsequently activate the electronic apparatus; and in response to determining that the biometric image does not meet the condition, prohibit the control button from being moved from the first position to the second position.

9. The electronic apparatus of claim 8, wherein:

the press operation is a first press operation;

the processor is further configured to execute the program instructions to, before collecting the biometric image:

cause the control button to move from an initial position to the first position in response to a second press operation of the user on the control button, to trigger a control signal for collecting the biometric image in the sensing area of the biometric recognition sensor, a distance between the initial position and the first position being smaller than a distance between the first position and the second position.

10. The electronic apparatus of claim 8, wherein the processor is further configured to execute the program instructions to determine whether the biometric image meets a preset image quality.

11. The electronic apparatus of claim 10, wherein the processor is further configured to execute the program instructions to:

determine whether a signal-to-noise ratio of the biometric image reaches a preset threshold; and in response to determining that the signal-to-noise ratio reaches the preset threshold, determine whether an area of the biometric image is greater than a preset value.

12. The electronic apparatus of claim 8, wherein the processor is further configured to execute the program instructions to determine whether the biometric image matches a preset target image.

13. The electronic apparatus of claim 8, wherein the processor is further configured to execute the program instructions to, in response to the biometric image does not meet the condition, recollect the biometric image within a preset time until the newly collected biometric image meets the condition.

14. The electronic apparatus of claim 13, wherein the processor is further configured to execute the program instructions to:

obtain a biometric image collection through the sensing area of the fingerprint sensor that is re-collected within the preset time;

perform self-learning on biometric images in the biometric image collection to obtain biometric characteristics of the biometric images in the biometric image collection;

generate a biometric comparison template based on the biometric characteristics; and add the biometric comparison template to a biometric comparison template library.

* * * * *